United States Patent [19]

Blondel et al.

[11] Patent Number: 5,416,172
[45] Date of Patent: May 16, 1995

[54] TRANSPARENT POLYAMIDE COMPOSITIONS HAVING HIGH RESISTANCE TO CHEMICAL AGENTS

[75] Inventors: Philippe Blondel, Bernay, France; Philippe Maj, Bad Honnef, Germany

[73] Assignee: Elf Atochem, S.A., France

[21] Appl. No.: 993,720

[22] Filed: Dec. 18, 1992

[30] Foreign Application Priority Data

Dec. 31, 1991 [FR] France .................................. 91 16403

[51] Int. Cl.$^6$ ........................ C08L 77/10; C08G 69/26
[52] U.S. Cl. .................................... 525/432; 525/419; 528/346; 528/324
[58] Field of Search ................ 525/432, 419; 528/346, 528/324

[56] References Cited

U.S. PATENT DOCUMENTS 4,232,145  11/1980  Schmid ................................. 528/324
4,731,421  3/1988  Hoppe ................................... 525/432

FOREIGN PATENT DOCUMENTS 0215054  10/1985  Japan .
3033157   2/1991  Japan .

*Primary Examiner*—James J. Seidleck
*Assistant Examiner*—I. Zemel
*Attorney, Agent, or Firm*—John L. Sigalos

[57] ABSTRACT

Transparent polyamide compositions having high resistance to chemical agents, as well as the process for their preparation and the articles obtained from said compositions. The present polyamide compositions contain from 1 to 99% by weight, preferably 40 to 90% by weight, of a first polyamide consisting of aliphatic units containing at least 7 carbon atoms, isophthalic and terephthalic diacids, the latter being predominant, and cycloaliphatic diamine units, and from 99 to 1% by weight, preferably 60 to 10%, of a semi-crystalline polyamide consisting of at least 35%, preferably 50%, by weight of an aliphatic unit containing at least 7 carbon atoms.

19 Claims, No Drawings

TRANSPARENT POLYAMIDE COMPOSITIONS HAVING HIGH RESISTANCE TO CHEMICAL AGENTS

BACKGROUND OF THE INVENTION

The present invention relates to transparent polyamide compositions having high resistance to chemical agents, as well as to the process for their preparation and the articles obtained from said compositions.

Those polyamides, as well as their alloys, are widely used for numerous applications. Some of these applications require specific properties. Amongst these desired properties mention may be made of the impact strength, the tensile strength and/or the compressive strength, that is to say the mechanical properties. Other desired properties are the transparency and the high resistance to chemical agents in order to resist atmospheric agents over time. Numerous articles require a transparent appearance, a high resistance to chemical agents and good mechanical properties. Bottles, stoppers, spectacle frames and others may be mentioned by way of example.

There is therefore, a current need to have available said transparent materials having a high resistance to chemical agents.

Numerous homopolyamides and copolyamides, both amorphous and crystalline, have therefore been proposed. Similarly, the mixtures or alloys of the latter have been proposed. These alloys consist of a transparent amorphous copolyamide mixed with crystalline (co)polyamide. The aim of these alloys is to obtain a reduction in the production cost and/or an improvement in the resistance to chemical agents.

Thus, JP-60-215053 and 60-214054 (KOKAI) describe and claim alloys comprising, on the other hand, a transparent polyamide and, on the other hand, a crystalline polyamide. The transparent polyamide consists of aliphatic units as an essential monomer component, chosen from lauryl lactam, 12-aminododecanoic acid or 11-aminoundecanoic acid, and cyclic units. The examples gtiven for these transparent polyamides reveal a cycloaliphatic diamine, bis-(4-aminocyclohexyl)methane, and an aromatic diacid, isophthalic acid, as cyclic units. The crystalline polyamide consists of polyamide-12 and/or -11, or of copolyamide having a 12 and/or 11 unit as essential monomer. The mixing conditions are not specified; it is merely indicated that any known process can be used. The resulting compositions are transparent.

FR-A-2,575,756 and FR-A-2,606,416 describe and claim mixtures or alloys similar to those mentioned above. Again, in this case, isophthalic acid is the predominant aromatic diacid component and the mixing conditions are not specified. The mixtures or alloys obtained are transparent.

The mixture of polyamides as used in the cases cited above meets the conditions imposed by the products to be mixed. Thus, U.S. Pat. No. 4,404,317 describes the mixing conditions, such as the temperature, for diverse polyamides; in partaicular, it is recommended not to exceed 300° C. because of the degradation of the crystalline polyamide as well as of the amorphous polyamide. In particular, in the "Technical Data Sheet" notice relating to the transparent polyamide Grilamid ® TR 55 which consists of a lauryl lactam unit, isophthalic acid as aromatic diacid and bis-amine A as cycloaliphatic diamine, it is specified that the injection moulding and extrusion temperatures are from 280° to 305° C. and from 270° to 286° C., respectively. Moreover, it is known that crystalline polyamides (including PA12 or PA6,12) have a degradation temperature of the order of 270°, both for injection moulding and for extrusion, which may be applied for very short times or in the presence of a stabilizer at a temperature of about 300° C. This is described in the HULS "Engineering Thermoplastics" technical note, on page 65.

EP-A-0 313 436 (in the name of Applicant) describes transparent polyamides in which, on the other hand, terephthalic acid is the predominant aromatic diacid component. These amorphous transparent polyamides have surprising properties both in respect of mechanical properties and in respect of the resistance to chemical agents. Unfortunately, the mixing of these amorphous transparent polyamides with a crystalline polyamide under the conventional conditions mentioned above leads to a composition which is not transparent.

Thus, the desired alloys of these transparent polyamides having improved properties are not transparent if they are produced under normal conditions, and a temperature which is too high would lead to the degradation of the polymers.

SUMMARY OF THE INVENTION

Surprisingly, it has been found by the Applicant that the said desired alloys are obtained by virtue of the present invention.

Thus, the present invention relates to a transparent polyamide composition having a high resistance to chemical agents, comprising, by weight:

(a) 1 to 99%, preferably 5 to 95%, of a first polyamide characterized by the chains:

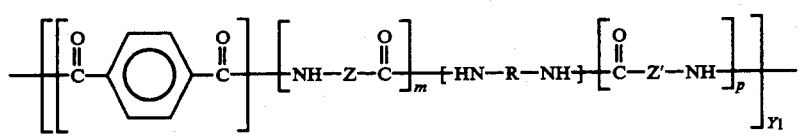

and

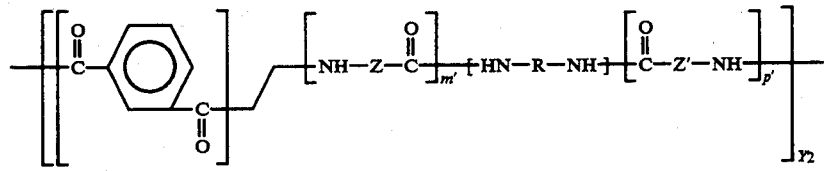

in which:
> $y_1$ and $y_2$ are numbers such that their sum $y_1+y_2$ is between 10 and 200 and $y_1/y_1+y_2 \geq 0.5$;
>
> m, p, m' and p' are numbers equal to or greater than 0;
>
> Z and Z', in the aliphatic units —NH—Z—CO— and —NH—Z'—CO—, may be identical or different, are either a polymethylene segment —(—CH$_2$—)—$_n$ where n is an integer equal to or greater than 6 and preferably between 7 and 11, or a sequence containing an amide group resulting from the substantially stoichiometric condensation reaction of one or more aliphatic diamine(s) containing at least 4 carbon atoms between the amine groups and one or more aliphatic carboxylic diacid(s) containing at least 4, and preferably at least 6, carbon atoms between the acid groups; and
>
> —HN—R—NH— is a cycloaliphatic and/or aliphatic and/or arylaliphatic diamine;
>
> it being possible for up to 30 mol % of the aromatic diacid to be replaced by an aliphatic caraboxylic diacid containing more than 4, preferably 6, carbon atoms between the acid groups; and (b) 99 to 1%, preferably 95 to 4%, of a semi-crystalline polyamide comprising at least 35%, preferably 50%, by weight of an aliphatic unit defined by the sequence —NH—(CH$_2$)$_{n'}$—CO— where n' is an integer equal to or greater than 6 and preferably between 7 and 11, optionally as part of a semi-aromatic unit, and/or an aliphatic unit defined by the sequence containing an amide group resulting from the substantially stoichiometric condensation reaction of one or more aliphatic diamine(s) containing at least 4 carbon atoms between the amine groups and one or more aliphatic carboxylic diacid(s) containing at least 4, and preferably at least 6, carbon atoms between the acid groups.

The present invention also comprises compositions containing conventional fillers and/or additives, articles made from the inventive compositions hereof, and the process of making the compositions as set forth in greater detail below.

DETAILED DESCRIPTION

The aliphatic units —NH—Z—CO— and —HN—Z'—CO are obtained, during the synthesis, from lactam, a corresponding amino acid or a substantially stoichiometric condensation reaction of one or more aliphatic diamine(s) and one or more aliphatic carboxylic diacid(s). The lactams contain at least 7 carbon atoms, preferably 8 to 12. The preferred lactams are caproyl lactam, deca lactam, undecano lactam, lauryl lactam or lactam 12, designated L12 below. L12, leading to unit 12, is particularly preferred. The corresponding amino acid is the $\alpha,\omega$-amino acid containing the same number of carbon atoms as the corresponding lactam. These $\omega$-amino acids contain at least 7 carbon atoms, preferably 8 to 12 The preferred $\alpha,\omega$-amino acids are 10-aminodecanoic acid, 11-aminoundecanoic acid and 12-aminododecanoic acid.

The aliphatic carboxylic diacid is a carboxylic $\alpha,\omega$-diacid having at least 4 carbon atoms (not including the carbon atoms of the carboxyl group), preferably at least 6, in the straight or branched carbon chain. The preferred carboxylic diacids are adipic acid, azelaic acid, sebacic acid and 1,12-dodecanoic acid.

The term "aliphatic diamine" as used in the present invention denotes an $\alpha,\omega$-diamine containing at least 4 carbon atoms, preferably 6 to 12, between the terminal amino groups. The carbon chain is straight (polymethylenediamine) or branched. Mixtures of aliphatic diamines are also provided in the present invention. Preferred aliphatic diamines are hexamethylenediamine (HMDA), 2,2,4- and/or 2,4,4-trimethylhexamethylenediamine, dodecamethylenediamine, trimethylhexamethylenediamine, methylpentamethylenediamine, 5-methylnonamethylenediamine and decamethylenediamine.

The term "cycloalphatic diamine" as used in the present invention denotes an amine of formula:

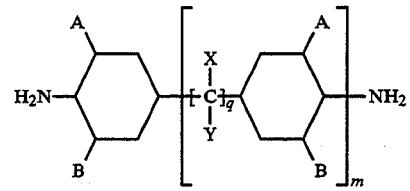

in which:
> A and B, which are identical or different, represent hydrogen, a methyl radical, an ethyl radical or an isopropyl radical;
>
> X and Y, which are identical or different, represent hydrogen or a methyl radical;
>
> q is an interger between 0 and 6;
>
> m is 0 or 1.

Mixtures of cycloaliphatic diamines are also provided in the present invention.

This term "cycloaliphatic diamine" also covers, in the sense of the present invention, the diamines containing a cycloaliphatic structure as defined by the above formula in their carbon chain. Isophoronediamine and 3,6-diamineomethyltricyclodecane may be mentioned by way of example.

The following diamines may be mentioned as examples of cycloaliphatic diamines: isophoronediamine, bis-(4-aminocyclohexyl)methane (BACM), bis-(3-methyl-4-aminocyclohexyl)methane (BMACM), bis-(3-methyl-4-amino-5-ethylcyclohexyl)methane, 1,2-bis-(4-aminocyclohexyl)ethane, 2,2'-bis-(4-aminocyclohexyl)-propane, and 2,2'-bis-(3-methyl-4-aminocyclohexyl)-propane.

The term "arylaliphatic diamine(s)" as used in the present invention denotes the amines of formula:

in which:
> $R_1$ and $R_2$, which may be identical or different, are straight-chain or branched $C_1$ to $C_6$ hydrocarbon residues; and
>
> Ar is a divalent aromatic radical which denotes an an aromatic ring or two or more aromatic rings bonded by an alkyl group, it also being possible for the said radical Ar to be substituted in any configuration, ortho, meta, or para.

Mixtures of arylaliphatic diamines are also provided in the present invention. Meta-xylylenediamine (for which Ar=m-phenyl and $R_1=R_2=$—CH$_2$—) may be mentioned by way of example.

Saturated derivatives or those containing an aromatic-aliphatic structure in their carbon chain are also provided in the present invention. 1,3-bis-aminomethylcyclohexane and 1,3-diaminomethylnorbornane may be mentioned by way of example.

Mixtures of aliphatic and/or cycloaliphatic and/or arylaliphatic diamine(s), in particular isomers, are also provided in the present invention.

The term "substantially stoichiometric" indicates a diamine/diacid molar ratio of between 1.1/1 and 1/1.1. Thus, the term "substantially stoichiometric condensation reaction of one or more diamine(s) and one or more diacid(s)" may represent the unit 6,6 or 6,12, for example.

The term "optionally as part of an aromatic unit" as used in the present invention indicates that the aliphatic part of this semi-aromatic unit is compatibilized; by way of example, for a polyamide 12-12,T of 50/50 composition by weight, the aliphatic unit represents 75% by weight of this polyamide.

The term "transparent polyamide" as used in the present invention denotes a polyamide for which the transmittance, when the polyamide is in the form of a thin plate 2 mm thick, is at least 70%.

According to one embodiment of the present invention, the composition comprises, by weight:
(a) 40 to 90% of the said first polyamide; and
(b) 60 to 10% of the said semi-crystalline polyamide.

Advantageously, the said composition comprises, by weight:
(a) 50 to 80% of the said first polyamide; and
(b) 50 to 20% of the said semi-crystalline polyamide.

According to one embodiment of the present invention, the said semi-crystalline polyamide contains at least 80% by weight of an aliphatic unit defined by the sequence —NH—$(CH_2)_{n'}$—CO where n' is 7, 10 or 11, optionally as part of a semi-aromatic unit, and/or an aliphatic unit defined by the sequence containing an amide group resulting from the substantially stoichiometric condensation reaction of one or more aliphatic diamine(s) containing at least 6 carbon atoms between the amine groups and one or more aliphatic carboxylic diacid(s) containing at least 7 carbon atoms between the acid groups.

Advantageously, the said semi-crystalline polyamide is chosen from the group comprising: PA 12, PA 11, the corresponding copolymers in which the said units 12 or 11 represent more than 80% by weight, and mixtures thereof.

According to a preferred embodiment of the present invention, the said semi-crystalline polyamide is PA 12 and/or PA 11. The molecular weight of the semi-crystalline polyamide is between about 10,000 and 30,000, preferably 15,000 and 25,000.

According to one embodiment of the present invention, the aliphatic units in the said first polyamide are 12 and/or 11 units.

Advantageously, the cycloaliphatic diamine has the formula:

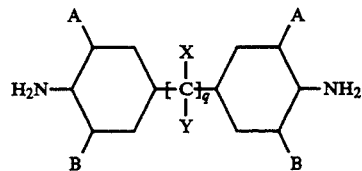

in which:
A and B, which may be identical or different, represent a hydrogen atom or a methyl radical;
X and Y, which may be identical or different, represent a hydrogen atom or a methyl radical;
q is an interger between 1 and 3;
up to 50 mol % of which may optionally be replaced by isophoronediamine.

Preferably, the cycloaliphatic diamine is bis-(3-methyl-4-aminocyclohexyl)methane, up to 50 mol % of which is optionally replaced by isophoronediamine.

The preferred first polyamide is L12/TA/IA/B-MACM in the molar proportions: 2–0.5/0.7–0.5/0-.3–0.5/0.91–1.05. The molecular weight of the first polyamide is between about 8,000 and 25,000, preferably 10,000 and 20,000.

The composition according to the present invention may contain conventional fillers, conventional additives, amidification or transamidification catalysts and also other polymers, such as another amorphous or semi-crystalline polyamide. The conventional fillers are, for example, inorganic fillers such as: talc, magnesia, slag, kaolin, etc., in particular glass fibers. The conventional additives are, for example, light stablizers and/or heat stabilizers, dyes, optical brighteners, plasticizers, mould release agents, fireproofing agents and others.

The present invention also relates to the articles obtained from the present composition. The articles may be any conventionally formed of polyamides and produced by any known process, such as, for example, injection moulding. The present compositions are prepared by virtue of a new process, another subject of the invention. The present invention therefore also relates to a process for the preparation of a transparent polyamide composition having a high resistance to chemical agents, comprising, by weight:
(a) 1 to 99%, preferably 5 to 95%, of a first polyamide characterized by the chains:

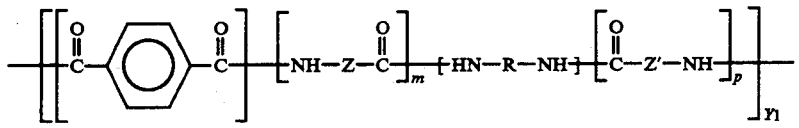

and

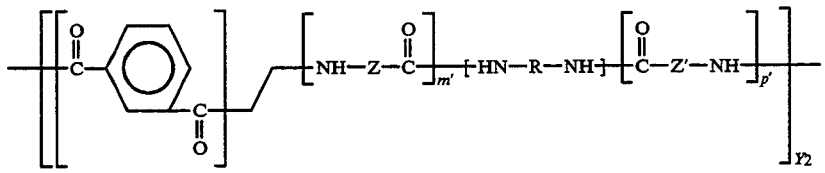

in which:
- $y_1$ and $y_2$ are numbers such that their sum $y_1+y_2$ is between 10 and 200; and $y_1/y_1+y_2 \geq 0.5$;
- m, p, m' and p' are numbers equal to or greater than 0;
- Z and Z' in the aliphatic units —NH—Z—CO— and —NH—Z'—CO—, which are identical or different, are either a polymethylene segment —(—CH$_2$—)—$_n$ where n is an integer equal to or greater than 6 and preferably between 7 and 11, or a sequence containing an amide group resulting from the substantially stoichiometric condensation reaction of one or more aliphatic diamine(s) containing at least 4 carbon atoms between the amine groups and one or more aliphatic carboxylic diacid(s) containing at least 4, and preferably at least 6, carbon atoms between the acid groups; and
- —HN—R—NH— is a cycloaliphatic and/or aliphatic and/or arylaliphatic diamine;

it being possible for up to 30 mol % of the aromatic diacid to be replaced by an aliphatic caraboxylic diacid containing more than 4, preferably 6, carbon atoms between the acid groups; and (b) 99 to 1%, preferably 95 to 5%, of a semi-crystalline polyamide comprising at least 35%, preferably 50%, by weight of an aliphatic unit defined by the sequence —NH—(CH$_2$)$_{n'}$—CO— were n' is an interger equal to or greater than 6 and preferably between 7 and 11, optionally as part of a semi-aromatic unit, and/or an aliphatic unit defined by the sequence containing an amide group resulting from the substantially stoichiometric condensation reaction of one or more aliphatic diamine(s) containing at least 4 carbon atoms betwen the amine groups and one or more aliphatic carboxylic diacid(s) containing at least 4, and preferably at least 6, carbon atoms between the acid groups;

characterized in that it comprises a step for mixing the said first polyamide and semi-crystalline polyamide at a temperature greater than 300° C., preferably between 300° and 400° C.

The temperature of the mixing step is high, higher than the decomposition temperature of polyamides, but, entirely surprisingly, this decomposition does not take place and transparent polyamide compositions having a high resistance to chemical agents are obtained.

According to one embodiment of the present process, the temperature of the said mixing step is between 300° C. and 370° C. The dwell time at this temperature is between 1 second and 20 minutes, preferably 10 seconds and 5 minutes.

Alternatively, another process consists in mixing the said abovementioned first polymer, optionally in the form of a prepolymer having a degree of polymerization of at least 50%, with the said abovementioned semi-crystalline polymer at a temperature of between 250° and 350° C., in the presence of an amidification or trans-amidification catalyst, with a dwell time of 1 to 60 minutes. This mixing step may be carried out in the presence of additives and/or fillers. This process also applies to the polymers in which the isophthalic acid content is higher than the terephthalic acid content.

Thus, the present invention also relates to a process for the preparation of a transparent polyamide composition having a high resistance to chemical agent, comprising, by weight:

(a) 1 to 99%, preferably 5 to 95%, of a first polyamide characterized by the chains:

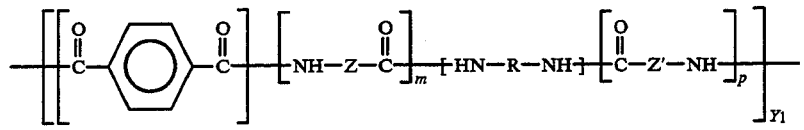

and

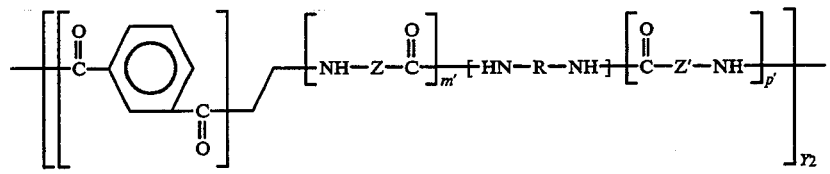

in which:
- $y_1$ and $y_2$ are numbers such that their sum $y_1+y_2$ is between 10 and 200;
- m, p, m' and p' are numbers equal to or greater than 0;
- Z and Z', in the aliphatic units —NH—Z—CO— and —NH—Z'—CO—, which are identical or different, are either a polymethylene segement —(—CH$_2$)—$_n$ where n is an integer equal to or greater than 6 and preferably between 7 and 11, or a sequence containing an amide group resulting from the substantially stoichiometric condensation reaction of one or more aliphatic diamine(s) containing at least 4 carbon atoms between the amine functional groups and of one or more aliphatic carboxylic diacid(s) containing at least 4 and preferably at least 6 carbon atoms between the acid groups; and —HN—R—NH— denotes a cycloaliphatic and/or aliphatic and/or arylaliphatic amine;

it being possible for up to 30 mol % of the aromatic diacid to be replaced by an aliphatic carboxylic diacid containing more than 4, preferably 6, carbon atoms between the acid groups, and (b) 99 to 1%, preferably 95 to 5%, of a semi-crystalline polyamide comprising at least 35%, preferably 50%, by weight of an aliphatic unit defined by the sequence —NH—$(CH_2)_{n'}$—CO— where $n'$ is an integer equal to or greater than 6 and preferably between 7 and 11, optionally as part of a semi-aromatic unit, and/or an aliphatic unit defined by the sequence containing an amide group resulting from the substantially stoichiometric condensation reaction of one or more aliphatic diamine(s) containing at least 4 carbon atoms between the amine groups and one or more aliphatic carboxylic diacid(s) containing at least 4, and preferably at least 6, carbon atoms between the acid group;

characterized in that it comprises a step for mixing the said first polyamide, optionally in the form of a prepolymer having a degree of polymerization of at least 50% and the said semi-crystalline polymer at a temperature of between 250° and 350° C. in the presence of an amidification or trans-amidification catalyst.

Preferably, the operating conditions are as follows. The catalyst is phosphoric or hypophosphorous acid; the mixing temperature is 280° to 340° C.; the dwell time is 5 to 33 minutes; and the degree of polymerization of the said prepolymer is at least 90%.

Preferably, the mixing step is carried out in an extruder. Thus, the first and semi-crystalline polyamides are ground to give granules or a powder and then charged into an extruder, in which they are progressively heated to a temperature higher than the melting point. The extruder may be any conventional, single-screw or twin-screw, extruder, having a L/D ratio of preferably between 10 and 60, and preferably having a mixer section.

The present invention is illustrated in more detail with the aid of the following examples, which are given by way of illustration, but are not limiting. In these examples the resistance to chemical agents is determined by determining the absorption of ethanol.

The analytical methods are as follows:

The glass transition temperature Tg is determined using a Perkin-Elmer DSC-4 apparatus on second heating at 20° C./min following intermediate cooling at 40° C./min. The value is taken at the mid point of the transition.

The absorption of ethanol is determined on predried IFC (Institut Francais de Caoutchouc)-type test pieces 2 mm thick and weighing about 1 g, after 8 days immersion in pure ethanol at 25° C. The value is given as the percentage increase in the initial weight (EtOH 8 days, %).

The inherent viscosities are determined at 25° C. using 0.5 g/dl solutions in m-cresol.

EXAMPLES 1 TO 5

The examples were carried out in a Werner 30 twin-screw extruder provided with a mixer section, using, as starting materials, semi-crystalline polyamide PA-12 having an inherent viscosity of 1.52 dl/g and the first polyamide (A). The latter is synthesized by a polycondensation reaction in the molten state, from bis-(3-methyl-4-aminocyclohexyl)methane (BMACM), lauryl lactam (L12) and isophthalic and terephthalic acids (IA and TA) in a molar ratio of 1/1/0.3/0.7, and has a Tg of 170° C. and an inherent viscosity of 1.05 dl/g.

The conditions are given in Table 1, with the appearance of the product obtained and its glass transition temperature.

The products obtained by compounding at 310° or 320° C. are all transparent.

COMPARATIVE EXAMPLES 6 TO 10

These examples were carried out using the same apparatus and the same products as Experiments 1 to 5, but using lower mixing temperatures, and they are not transparent. The results are given in Table 1.

TABLE 1

| Example | Mass fractions of first PA (A) | PA12 (B) | Temp. of the material °C. | Dwell time mn | Remarks |
|---|---|---|---|---|---|
| Remarks | | | | | |
| 1 | 80 | 20 | 310 | 2.2 | transparent |
| 2 | 75 | 25 | 320 | 2.2 | transparent |
| 3 | 75 | 25 | 320 | 1.3 | transparent |
| 4 | 70 | 30 | 320 | 2.2 | transparent |
| 5 | 70 | 30 | 320 | 1.3 | transparent |
| 6 | 80 | 20 | 280 | 1.3 | slightly opaque |
| 7 | 80 | 20 | 280 | 2.2 | slightly opaque |
| 8 | 80 | 20 | 300 | 1.3 | slightly opaque |
| 9 | 75 | 25 | 300 | 1.3 | opaque |
| 10 | 75 | 25 | 300 | 2.2 | slightly opaque |

EXAMPLES 11 TO 16

These examples were carried out by compounding at 310° or 320° C. in a Haacke laboratory twin-screw extruder provided with a mixer section, using, as starting materials, a mixture of granules of first polyamide have a Tg of 170° C., similar to that of Example 1, and PA12 similar to that of Example 1.

The mixtures obtained containing 20 to 50% of PA12 are all transparent and have a single Tg between 131° and 73° C. These results and the operating conditions are given in Table 2.

COMPARATIVE EXAMPLES 17 TO 20

In a manner comparable to Examples 11 to 16, these experiments are carried out by compounding at a temperature of between 260° and 295° C. using PA12 proportions of 20 and 30%. All of these experiments result in opaque articles and have a melting point of towards 175° C. The results are given in Table 2.

TABLE 2

| Example | Mass Fractions First PA (A) | PA12 (B) | Temperature of the material °C. | Speed of rotation rev/min | Tg. °C. | EtOH 8 days % | Remarks |
|---|---|---|---|---|---|---|---|
| 11 | 80 | 20 | 310 | 80 | 131 | | transparent |

TABLE 2-continued

| Example | Mass Fractions First PA (A) | PA12 (B) | Temperature of the material °C. | Speed of rotation rev/min | Tg. °C. | EtOH 8 days % | Remarks |
|---|---|---|---|---|---|---|---|
| 12 | 75 | 25 | 320 | 40 | 124 | 27 | transparent |
| 13 | 65 | 35 | 320 | 60 | 102 | 24.7 | transparent |
| 14 | 60 | 40 | 320 | 80 | 90 | 23.8 | transparent |
| 15 | 55 | 45 | 320 | 80 | 88 | 22.6 | transparent |
| 16 | 50 | 50 | 320 | 20 | 73 | 21.6 | transparent |
| 17 | 80 | 20 | 295 | 75 | 132 (mp175) | | slightly opaque |
| 18 | 80 | 20 | 295 | 35 | 121 (mp176) | | slightly opaque |
| 19 | 80 | 20 | 280 | 60 | 145 (mp174) | | opaque |
| 20 | 70 | 30 | 260 | 60 | 133 (mp177) | | opaque |

EXAMPLES 21 TO 30

These examples were carried out by compounding a mixture of granules of first polyamide and PA11 or PA12 in a Haacke laboratory twin-screw extruder. All of the products obtained are transparent and have a relatively low ethanol absorption, determined after 8 days immersion at 25° C. The results are given in Table 3. The abbreviations are those used in Example 1, with, in addition AA for adipic acid and M11 for 11-aminoundecanoic acid.

TABLE 3

| Example | Monomers | First PA molar fractions | Tg °C. | Crystalline Type | PA Mass fraction | Temperature C° | Mixing speed rev/min | Tg. °C. | EtOH Absorption % |
|---|---|---|---|---|---|---|---|---|---|
| 21 | L12/TA/IA/AA/BMACM | 0.8/0.63/0.71/0.1/1 | 177 | PA12 | 30 | 320 | 45 | 120 | 26.1 |
| 22 | " | 0.1/0.5/0.3/0.2/1 | 152 | " | 25 | " | 55 | 110.5 | 30.9 |
| 23 | L12/TA/IA/BMACM | 0.7/0.6/0.4/1 | 185 | PA12 | 25 | 320 | 175 | 140 | 29.3 |
| 24 | " | " | " | " | 30 | " | 125 | 133 | 26.8 |
| 25 | " | " | " | " | 35 | " | 125 | 118 | 25.3 |
| 26 | L12/TA/IA/BMACM | 0.6/0.6/0.4/1 | 195 | PA12 | 20 | 320 | 150 | 151 | 32 |
| 27 | " | " | " | " | 25 | " | 150 | 142 | 30 |
| 28 | M11/TA/IA/BMACM | 1.3/0.75/0.25/1.02 | 157 | PA11 | 25 | 310 | 80 | 113 | 31.5 |
| 29 | L12/TA/IA/BMACM | 1/0.7/0.3/1 | 169 | " | 25 | " | 150 | 126 | 32.6 |
| 30 | " | " | " | " | 30 | 310 | 150 | 115 | 29.2 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A transparent polyamide composition, comprising, by weight:
   (a) 1 to 99% of a first polyamide characterized by the chains:

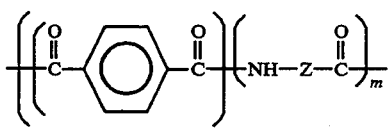

and

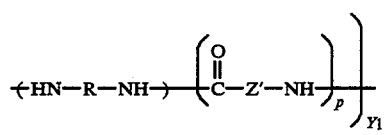

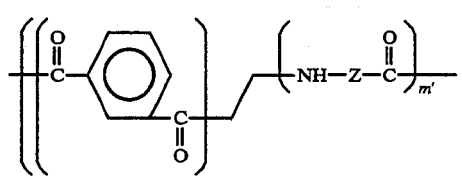

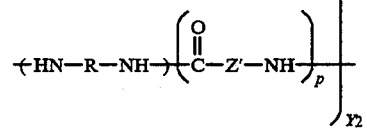

in which:
   $y_1$ and $y_2$ are numbers such that their sum $y_1+y_2$ is between 10 and 200 and $y_1/y_1+y_2 \geq 0.5$;
   m, p, m' and p' are numbers equal to or greater than 0;
   Z and Z', in the aliphatic units —NH—Z—CO— and —NH—Z'—CO—, which are identical or different, are either a polyethylene segment —(—CH$_2$—)—$_n$ where n is an integer with a value from 6 to 11, or a sequence containing an amide group resulting from the substantially stoichiometric condensation reaction of one or more aliphatic diamine(s) containing at least 4 carbon atoms between the amine groups and one or more aliphatic carboxylic diacid(s) containing from 4 to 6 carbon atoms, between the acid groups; and
   —HN—R—NH— is a cycloaliphatic and/or aliphatic and/or arylalliphatic diamine;
wherein up to 30 mol % of the aromatic diacid is replaceable by an aliphatic carboxylic diacid containing from 4 to 6 carbon atoms between the acid group; and, correspondingly, (b) 99 to 1% of a semi-crystalline polyamide comprising from 35% to 50%, by weight of an aliphatic unit defined by the sequence —NH—(CH$_2$)$_{n'}$—CO— where n' is an integer with a value from 6 to 11, which is part of a semi-aromatic unit and/or an aliphatic unit defined by the sequence containing an amide group resulting from the substantially stoichiometric condensation reaction of one or more aliphatic diamine(s) containing at least 4 carbon atoms between the amine groups and one or more aliphatic carboxylic diacid(s) containing from 4 to 6 carbon atoms between the acid groups.

2. The composition of claim 1, characterized in that the said composition comprises, by weight:
   (a) 40 to 90% of the said first polyamide; and, correspondingly,
   (b) 60 to 10% of the said semi-crystalline polyamide.

3. The composition of claim 1, characterized in that the said composition comprising by weight:
   (a) 50 to 80% of the said first polyamide; and, correspondingly,
   (b) 50 to 20% of the said semi-crystalline polyamide.

4. The composition of claim 3, wherein in the sequence —NH—(CH$_2$)$_{n'}$—CO—, n' is 7,10 or 11, and/or an aliphatic unit defined by the sequence containing an amide group resulting from the substantially stoichiometric condensation reaction of one or more aliphatic diamine(s) containing at least 6 carbon atoms between the amine group and one or more aliphatic carboxylic diacid(s) containing at least 7 carbon atoms between the acid groups.

5. The composition of claim 4, characterized in that the said semi-crystalline polyamide is selected from polyamide 12, polyamide 11, the corresponding copolymers in which the said units 12 or 11 represent more than 80% by weight, or mixtures thereof.

6. The composition of claim 5, characterized in that the said semi-crystalline polyamide is polyamide 12 and/or polyamide 11.

7. The composition of claim 6, characterized in that the said semi-crystalline polyamide has a molecular weight of between about 10,000 and 30,000.

8. The composition of claim 7, characterized in that, in the said first polyamide, the aliphatic units are present in proportion of at least 10% by weight.

9. The composition of claim 8, characterized in that, in the said first polyamide, the aliphatic units are obtained from lauryl lactam and/or undecano lactam.

10. The composition of claim 9, characterized in that the diamine is cycloaliphatic diamine.

11. The composition of claim 10, characterized in that the said cycloaliphatic diamine has the formula:

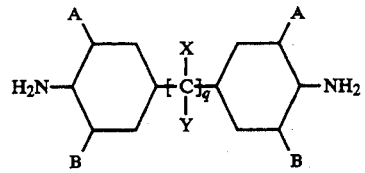

in which:
A and B, which may be identical or different, represent a hydrogen atom or a methyl radical;
X and Y, which may be identical or different, represent a hydrogen atom or a methyl radical; and
q is an interger between 1 and 3;
up to 50 mol % of which is replaced by isophoronediamine.

12. The composition of claim 11, characterized in that the cycloaliphatic diamine is bis-(3-methyl-4-aminocyclohexyl)methane, up to 50 mol % of which is replaced by isophoronediamine.

13. The composition of claim 12 characterized in that the said first polyamide corresponds to lauryl lactam/terephthalic acid/isophthalic acid/bis-(-3-methyl-4-aminocyclohexyl) methane in the molar proportions: 2–0.5/0.7–0.5/0.3–0.5/0.95–1.05.

14. The composition of claim 13, characterized in that the said first polyamide has a molecular weight of between about 8,000 and 25,000.

15. The composition of any one of claims 1 to 14, characterized in that it also contains a filler and/or an additive.

16. An article obtained by shaping a composition according to any one of claims 1 to 14.

17. The composition of claim 1 comprising 5 to 95% by weight of the first polyamide and 95 to 4% by weight of the semi-crystalline polyamide.

18. The composition of claim 6 wherein the said semi-crystalline polyamide has a molecular weight of between about 15,000 to 25,000.

19. The composition of claim 13 wherein the first polyamide has a molecular weight of between about 10,000 to 20,000.

* * * * *

UNITED STATES PATENT AND TRADEMARK OFFICE
CERTIFICATE OF CORRECTION

PATENT NO. : 5,416,172

DATED : May 16, 1995

INVENTOR(S) : Blondel et al

It is certified that error appears in the above-indentified patent and that said Letters Patent is hereby corrected as shown below:

Col. 12, line 43, change "p" to --p'--;

Col. 13, line 4, change "n," to --n'--;

Col. 13, line 27, change "n," to --n'--.

Signed and Sealed this

Eighteenth Day of July, 1995

Attest:

BRUCE LEHMAN

Attesting Officer      Commissioner of Patents and Trademarks